United States Patent Office 3,156,367
Patented Nov. 10, 1964

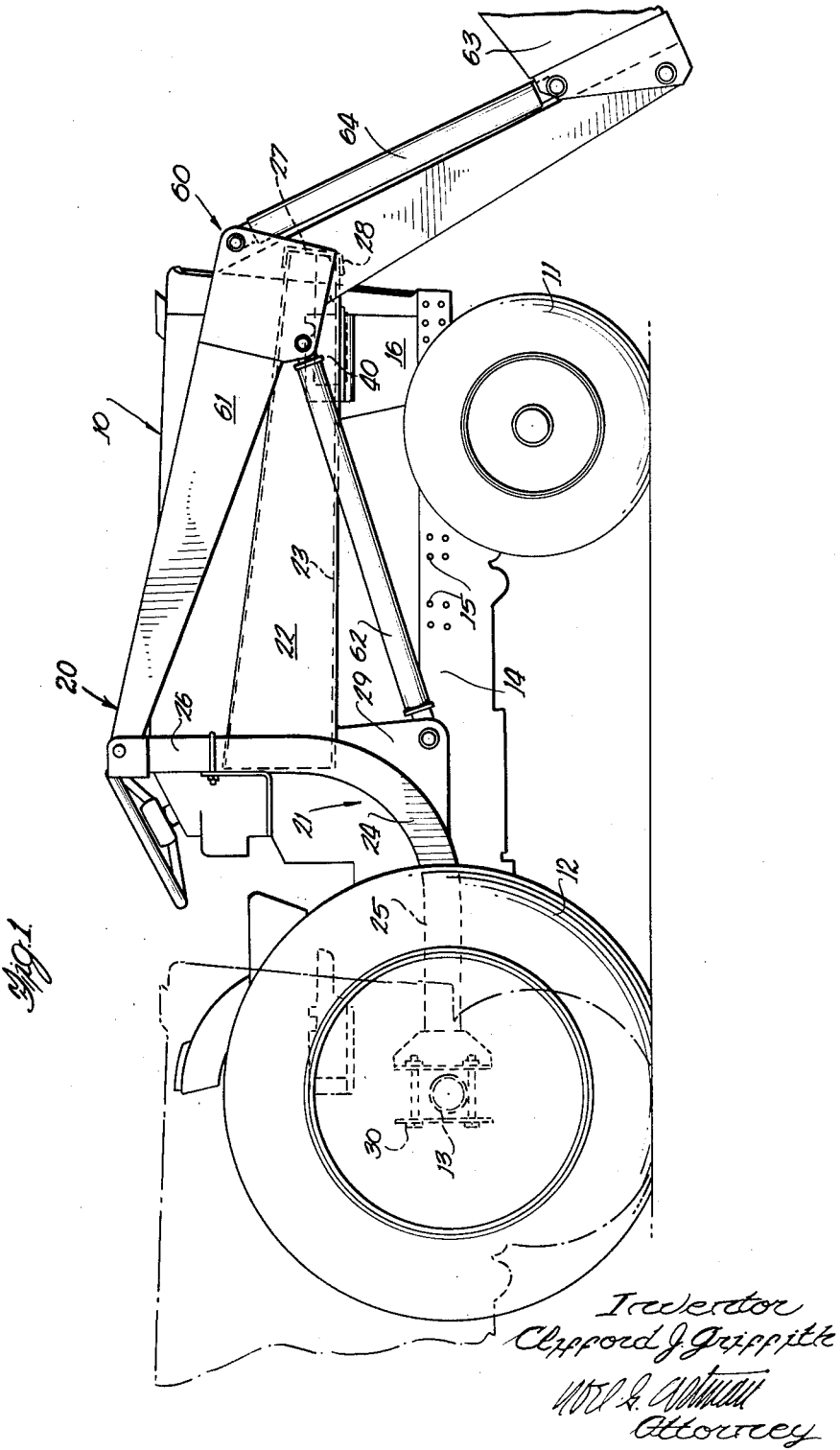

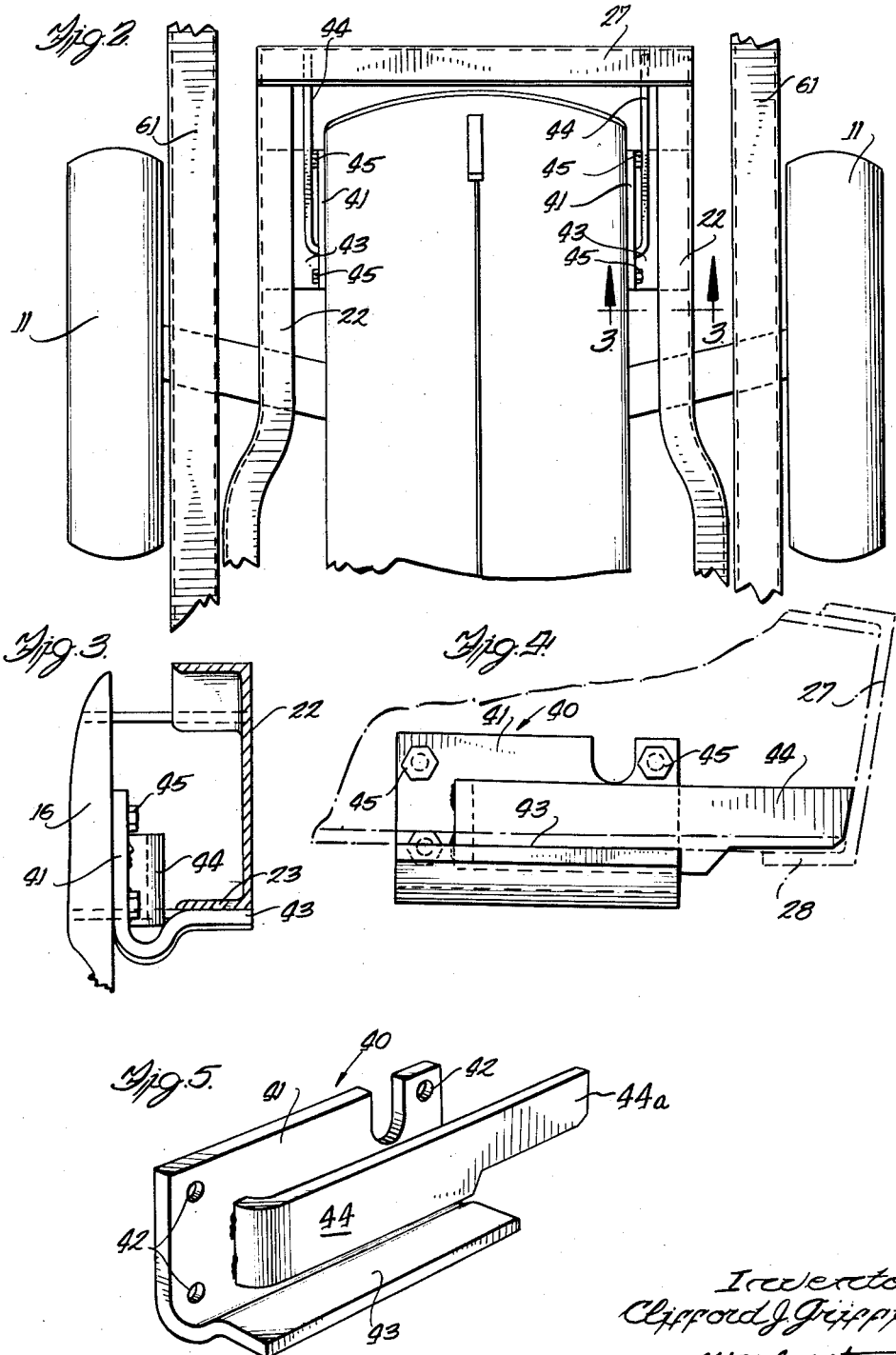

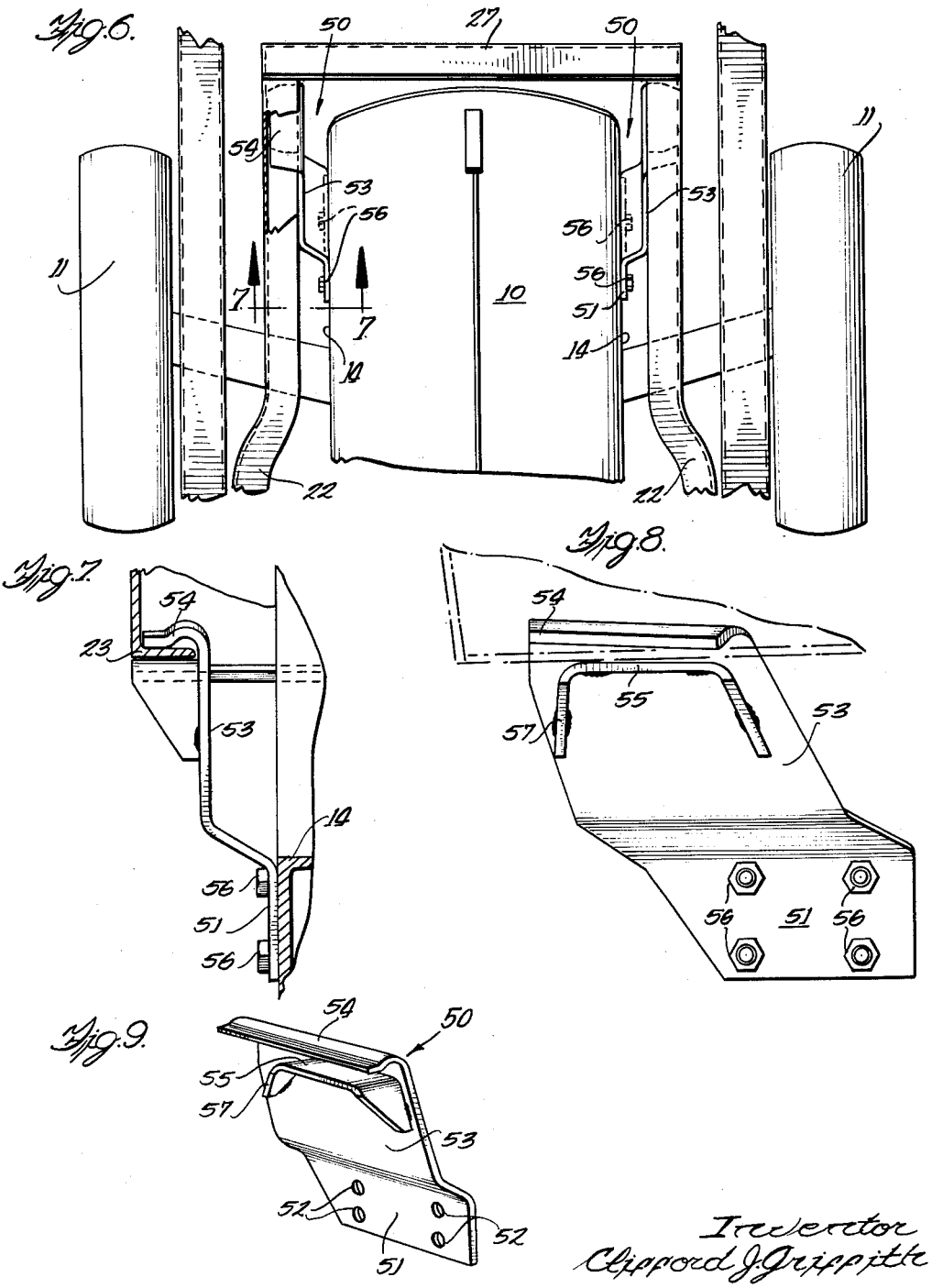

3,156,367
TRACTOR MOUNTED LOADER
Clifford J. Griffith, Westmont, Ill., assignor to International Harvester Company, Chicago, Ill., a corporation of New Jersey
Filed Jan. 16, 1963, Ser. No. 251,828
6 Claims. (Cl. 214—140)

The present invention relates generally to improvements in tractor mounted loaders and the like, and more particularly to a new and improved bracket construction for mounting loader frames on the front end of a tractor.

In the past, it has been the general practice to provide tractor mounted loaders in which the tractor can be driven into and out of the mounting position. Loaders of this type are normally connected to the rear axle structure of the tractor and to the front end of the tractor frame. Normally, some type of locking means are provided to positively secure the loader frame to the tractor at all of the mounting points, thus force is transmitted from the loader frame to the tractor frame and vice versa at all points of connections. Although such devices have served the purpose they have not proven entirely satisfactory under all conditions of service for the reason that it is desirable to transmit all horizontal components of force between the tractor and the loader frame through the rear axle structure, and transmit only vertical components of force through the front connections between the loader frame and the tractor frame. This is desirable since the heavy cast rear axle structure is sufficiently strong to withstand these large forces. However, the longitudinal frame of the tractor is not built to withstand such forces. Another disadvantage found in the prior art loaders is that some type of locking devices are normally required at four points of connection between the loader frame and the tractor, thus requiring a considerable amount of time to connect or disconnect the loader.

The general purpose of this invention is to provide a loader which embraces all the advantages of similarly employed loaders and possesses none of the aforedescribed disadvantages. To attain this, the present invention contemplates unique front brackets secured to the frame of the tractor that will transmit only the vertical components of force between the tractor and the loader frame and further requires no locking means to complete this connection. The mounting brackets are simple and inexpensive to manufacture and require no special adaptations to the loader frame. These brackets permit the tractor to be driven into the loading position and require no additional attention to the front connection between the loader and the tractor. Likewise, when the loader is to be unhitched from the tractor no manual attention is required of the front connection. The brackets are further so constructed such that a guideway is formed permitting a fast and simple hitching maneuver.

An object of the present invention is to provide a tractor mounted loader that will permit the tractor to be driven in and out of the mounting position.

Another object is to provide a tractor mounted loader that is mounted such that it transmits all horizontal components of force to the rear axle structure of the tractor.

A further object of the invention is the provision of a tractor mounted loader in which a minimum of securing means are necessary to mount the loader on the tractor.

Still another object is to provide mounting brackets on the front end of a tractor for supporting the loader frame, which front brackets do not require any locking mechanism.

These and other objects of the invention will become apparent from the specification and drawings, wherein:

FIGURE 1 is a side elevation view of a tractor having the loader mounted thereon. This figure also includes a phantom silhouette of the front of a tractor positioned relative to the loader as it would be before the tractor is driven into the mounting position;

FIGURE 2 is a plan view of a tractor having the loader mounted thereon;

FIGURE 3 is a cross sectional view taken along lines 3—3 of FIGURE 2;

FIGURE 4 is an elevation view of one embodiment of the mounting bracket showing its relationship with the longitudinal side members of the loader frame which are shown in phantom lines;

FIGURE 5 is a perspective view of the mounting bracket shown in FIGURE 4;

FIGURE 6 is a plan view of the front end of the tractor having the loader mounted thereon and utilizing another embodiment of the loader mounting brackets.

FIGURE 7 is a cross sectional view taken along lines 7—7 of FIGURE 6;

FIGURE 8 is an elevation view of the mounting bracket shown in FIGURE 6 and illustrates its relationship with the longitudinal side members of the loader frame which is shown in phantom lines; and FIGURE 9 is a perspective view of the mounting bracket shown in FIGURES 6 and 7.

Referring now to the drawings, wherein like reference characters designate like or corresponding parts throughout the several views, there is shown in FIGURE 1 a tractor generally designated 10 being of a conventional construction such as that disclosed in the patent to Ratcliff No. 2,332,752 issued on October 26, 1943. The tractor 10 includes front wheels 11, rear wheels 12, a rear axle structure 13, a longitudinal frame structure 14 having mounting means 15 therein, said mounting means 15 can include a mounting plate designated 16.

The loader and loader base 20 is of conventional construction including longitudinal side members 21 made up of a tapered channel 22 having a flange portion 23 also called the horizontal plate portion and a post 24 having a horizontal portion 25 and a vertical portion 26. A cross bar or cross channel 27 connects the front ends of tapered channels 22, as can be best seen in FIGURE 2. The cross channel 27 includes a flange 28 which forms a continuation of the horizontal plate portion 23 of the channel 22. Gusset plates 29 are provided at the juncture between channels 22 and post 24 for the purpose of adding rigidity to the loader base and also providing a pivot means for the hydraulic cylinder 62. Rear mounting means 30 are provided on the terminal ends of the horizontal portion 25 of post 24, for the purpose of securing the longitudinal side members 21 to the rear axle structure of the tractor.

The loader generally designated 60 is of conventional design and includes a boom arm designated 61 that is pivotally mounted on the terminal end of the vertical portion 26 of the post. A first hydraulic cylinder 62 is pivotally secured at one end to the gusset plate 29 and at the other end to the mid-portion of said boom arm 61 and expansion and contraction of this hydraulic cylinder functions to raise and lower the boom arm 61. A bucket 63 (partially shown) is pivotally secured to the free end of the boom arm 61 and is controlled by a second hydraulic cylinder 64 that is pivoted at one end to the upper portion of said bucket and at its other end to a mid-portion of the boom arm 61.

FIGURES 1 through 5 illustrate one embodiment of the mounting bracket designated 40. The mounting bracket disclosed in these figures is secured by bolts or the like 45 to the mounting plate 16 which forms a portion of the longitudinal frame structure of the tractor. One of these brackets is mounted on each side of the tractor at a position above the level of the rear axle structure. This embodiment of the bracket, which can be best seen in FIGURE 5, includes a vertical plate section 41 having a plurality of apertures 42 through which nuts and bolts 45 extend to secure the mounting bracket to the mounting plate 16. The lower portion of said mounting bracket is bent outwardly such that it extends normal to said vertical plate section and constitutes the horizontal support surface 43. A forwardly extending finger or restricting means 44 is secured to the vertical plate section 41 and extends forwardly therefrom and includes nose 44a. As is obvious in FIGURES 1 through 5, inclusive, the flange 23 of the channel 22 rests on the horizontal support surface 43 of the mounting bracket and the forwardly extending fingers 44 extend internally of the rearwardly opening cross channel 27 and nose 44a constitutes an upper restraining means that engages the flange 28 of said cross channel 27.

When the unloader is in the mounting position as illustrated in FIGURE 1 the rear mounting means 30 are fastened to rigidly connect the terminal ends of the longitudinal side members 21 to the rear axle structure. As is obvious from the above discussion, the front end of the loader frame is carried by the mounting brackets 40; however, the connection between the mounting brackets 40 and the flanges 23 and 28 is merely a sliding connection and functions only to transmit the vertical component of forces. In other words, if the loader is pushed rearwardly this force would not be transmitted to the tractor frame through the mounting brackets but rather would be transmitted through the longitudinal side members to the rear axle structure. The static weight of the loader and the horizontal component of any load being carried by the bucket 63 is, of course, transmitted through the mounting bracket to the frame structure and the front wheels 11. Thus, when, for example, the bucket is used as a ram, these forces are transmitted directly through the loader base to the rear axle structure and not through the longitudinal frame of the tractor.

Referring now to FIGURES 6 through 9, inclusive, a preferred embodiment of loader bracket will be discussed. This embodiment of the bracket is secured directly to the frame structure 14 by nuts and bolts 56 which extend through the mounting means 15 formed in said frame structure 14. The mounting bracket 50 comprises a first vertical plate section 51 having a plurality of apertures 52 formed therein through which said nuts and bolts 56 extend. The bracket 50 includes a second vertical plate 53 which is offset outwardly from said first vertical plate section 51 and the upper edge of said second vertical plate section terminates in a restricting means 54 formed by bending the upper edge of said second vertical plate outwardly. A lug 55 is secured to the outer surface of said second vertical plate section and forms the horizontal support surface upon which the flange 23 of the channel 22 rests. The lug 55 has downwardly and outwardly extending brace sections 57 which are also secured to the second vertical plate section 53. The brace section 57 that extends downwardly and forwardly forms with the restricting means 54 a guideway for directing the flange 23 between the horizontal support surface 55 and the restricting means 54. In this embodiment both the horizontal support surface and the restricting means coact with the flange 23 of the longitudinal side members and none of the forces are transmitted through the cross channel 27. This embodiment of the mounting bracket 50 is very advantageous since it can be secured directly to the longitudinal frame member through the mounting means 15 and no special adaptation is required on the loader base 20. As can be best seen in FIGURE 8, the restricting means 54 is elevated towards the front at a slight angle to the horizontal. The brace section 57 of the lug 55 declines at an angle to the horizontal and thus a guideway or throat section is provided to receive the flange 23 of the longitudinal side member. The inclination of the restricting means 54 and of the brace section 57 of the lug 55 will function to guide the flange 23 between the horizontal portions of said restricting means and lug.

Thus it is seen that mounting brackets have been provided that are adapted to be secured to the tractor frame that will enable the tractor to be driven in and out of the mounting position and no manual operation is required to complete the connection between the loader frame and the front end of the tractor frame. The only manual operation required to connect or disconnect the loader to the tractor is the rear mounting means 30.

It should be understood, of course, that the foregoing disclosure relates to only a preferred embodiment of the invention and that numerous modifications or alterations may be made therein without departing from the spirit and the scope of the invention as set forth in the appended claims.

What is claimed is:

1. The combination with a tractor having a frame including mounting means located along each side of the tractor, a rear axle structure, and mounting brackets secured to said mounting means on each side of the tractor; a loader attachment including a pair of longitudinal side members extending along each side of the tractor from said mounting brackets to said rear axle, the portion of said side members adjacent said mounting brackets having horizontal plate portions; said mounting brackets including horizontal support surfaces adapted to underlie said horizontal plate portions and thereby prevent downward movement of said side members, and restricting means elevated from said horizontal support surfaces adapted to engage the upper surfaces of said horizontal plate portions to prevent upward movement of said side members; and rear mounting means for securing said side members to said rear axle structure.

2. The invention as set forth in claim 1 wherein said longitudinal side members extend forwardly of the tractor and are connected by a cross bar having a portion that is a continuation of said horizontal plate portion, and said restricting means extending forwardly of said mounting brackets such that it overlies the horizontal plate portion of said cross bar.

3. The invention as set forth in claim 1 wherein said mounting bracket comprises a first vertical plate section adapted to be secured to said mounting means, a second vertical plate section offset outwardly from said first vertical plate and having its upper edge bent outwardly to form said restricting means, a lug secured to said second vertical plate such that it extends outwardly therefrom beneath said restricting means to form said horizontal support surface.

4. The invention as set forth in claim 1 wherein the forward ends of said longitudinal side members are formed of inwardly opening channels, a flange portion of which forms said horizontal plate portions.

5. The invention as set forth in claim 4 wherein said channels extend forwardly of the tractor and are connected by rearwardly opening cross channels, and said restricting means comprises forwardly extending fingers adapted to engage the upper surface of the flange of said rearwardly opening cross channels.

6. The invention as set forth in claim 3 wherein said lug includes a downward and forward extending surface forming converging guideway with said outward bent upper edge to guide the horizontal plate portion of said longitudinal side members between said restricting means and said lug.

References Cited in the file of this patent
UNITED STATES PATENTS

| | | |
|---|---|---|
| 1,725,201 | Lessmann | Aug. 20, 1929 |
| 1,898,312 | Ritchie | Feb. 21, 1933 |
| 2,659,572 | Steer | Nov. 17, 1953 |
| 2,746,624 | Stueland | May 22, 1956 |
| 2,846,095 | Sonneman et al. | Aug. 5, 1958 |